United States Patent
Morandin et al.

(10) Patent No.: US 12,085,322 B2
(45) Date of Patent: Sep. 10, 2024

(54) METHOD FOR OPTIMIZING THE ENERGETIC CONSUMPTION OF A REFRIGERATING MACHINE AND REFRIGERATING MACHINE IMPLEMENTING SAID METHOD

(71) Applicant: CAREL INDUSTRIES S.p.A., Brugine (IT)

(72) Inventors: Mattia Morandin, Brugine (IT); Biagio Lamanna, Brugine (IT); Luigi Nalini, Brugine (IT)

(73) Assignee: CAREL INDUSTRIES S.p.A., Brugine (IT)

( * ) Notice: Subject to any disclaimer, the term of this patent is extended or adjusted under 35 U.S.C. 154(b) by 549 days.

(21) Appl. No.: 17/443,930

(22) Filed: Jul. 28, 2021

(65) Prior Publication Data
US 2022/0065512 A1 Mar. 3, 2022

(30) Foreign Application Priority Data
Jul. 30, 2020 (IT) .......................... 102020000018556

(51) Int. Cl.
*F25B 49/02* (2006.01)
*G05B 19/4155* (2006.01)

(52) U.S. Cl.
CPC .......... *F25B 49/022* (2013.01); *F25B 49/025* (2013.01); *G05B 19/4155* (2013.01);
(Continued)

(58) Field of Classification Search
CPC ...... F25B 49/02; F25B 49/022; F25B 49/025; F25B 2600/11; F25B 2700/151;
(Continued)

(56) References Cited

U.S. PATENT DOCUMENTS

| 8,341,973 B2 * | 1/2013 | Liu ....................... F25B 49/022 |
| | | 702/60 |
| 8,375,735 B2 * | 2/2013 | Lifson ................... F25B 49/025 |
| | | 62/230 |

(Continued)

FOREIGN PATENT DOCUMENTS

| EP | 3672055 A1 | 6/2020 |
| IT | 102019000021534 | 5/2021 |

OTHER PUBLICATIONS

Italian Search Report dated Apr. 13, 2021 from Italian Application No. 2020000018556.

*Primary Examiner* — Alvin H Tan
(74) *Attorney, Agent, or Firm* — INNOVATION CAPITAL LAW GROUP, LLP; Vic Lin

(57) ABSTRACT

Method for optimizing the energy consumption of a refrigeration unit, comprising: a step A: activating a driving device (14) of the compressor (13) by modulating the operating voltage Vout of the compressor (13) to an optimized value designed to activate the compressor (13) at an optimized speed determined by a thermodynamic optimization algorithm; a step B: regulating the driving device (14) which drives the AC/DC converter (17) so that the bus voltage is equal to the greater between a first threshold and a second threshold; wherein the first threshold is equal to the product of √2 by the value of the supply voltage and the second threshold is equal to the product of √2 by the value of the driving voltage; a step C: modifying the speed of each fan in order to minimize the value of an overall electrical consumption.

20 Claims, 1 Drawing Sheet

(52) U.S. Cl.
CPC ... *F25B 2600/0253* (2013.01); *F25B 2600/11* (2013.01); *F25B 2700/151* (2013.01); *G05B 2219/50333* (2013.01)

(58) Field of Classification Search
CPC .. H02M 1/0054; H02M 1/007; H02M 1/4216; H02P 27/06; G05B 19/4155; G05B 2219/50333
See application file for complete search history.

(56) References Cited

U.S. PATENT DOCUMENTS

| | | |
|---|---|---|
| 2010/0300120 A1* | 12/2010 | Gerner ............... F25D 29/00 62/126 |
| 2015/0096320 A1 | 4/2015 | Kamiya et al. |
| 2018/0010835 A1 | 1/2018 | Khalili et al. |

* cited by examiner

METHOD FOR OPTIMIZING THE ENERGETIC CONSUMPTION OF A REFRIGERATING MACHINE AND REFRIGERATING MACHINE IMPLEMENTING SAID METHOD

BACKGROUND OF THE INVENTION

The invention relates to a method for optimizing the energy consumption of a refrigeration machine and a refrigeration machine which implements this method. In the field of vapour compression refrigeration machines with high energy performance, it is currently known to provide for a modulation of the operating speed of the compressor, operated by a controller with an inverter, to adapt the cooling capacity to the contingent demand.

In particular, a traditional refrigeration unit of this type comprises a vapour compression refrigeration circuit having a compression system that comprises one or more compressors, two heat exchangers, respectively a condenser and an evaporator passed through by a flow of so-called secondary fluid, for example air or water, and an expansion member, generally a mechanical or electro-operated valve.

The compression system can have at least one of the compressors capable of varying its working regime to modulate the cooling capacity of the machine, as discussed more fully below.

The above-mentioned heat exchangers have the function of exchanging the cooling or heating thermal energy produced by the refrigeration circuit with the external environment by means of a heat transfer fluid which, as mentioned, can be air, water or other gas or liquid, and it is designed to interact with the exchangers themselves to, respectively, release or absorb heat.

This heat transfer fluid is generally put into thermal contact with the said exchangers to exchange heat mainly by forced convection.

A pumping system will therefore be provided, if the heat transfer fluid is a liquid, or a ventilation system, if it is gaseous.

It is known that in a refrigeration circuit, in nominal working conditions, that is, in those in which it delivers the maximum refrigerating capacity in cooling or the maximum thermal capacity in heating, the component that consumes the most electricity is the compressor, with a ratio that can even reaches 10:1 compared to all other electrically operated components. In particular, in this nominal condition, the compressor absorbs more electrical energy than the pumps or fans that feed the heat transfer fluid to the heat exchangers.

Moreover, it is known that the electrical absorption of the compressor depends on the surrounding conditions, in particular on the inlet temperatures of the heat transfer fluids and on the mass flow of the same, the entity of which determines the suction and discharge pressure of the compressor.

Given a predetermined temperature condition of the two fluids, indicatively dependent on the thermohygrometric conditions of the two sources, that is, of the environments, with which the heat exchangers exchange energy, the greater the mass flow rate of the heat transfer fluids and the lower the pressure jump that the compressor must overcome, resulting in less electrical absorption of the same.

From the previous considerations it is clear that the nominal working condition of a refrigeration circuit benefits, in terms of energy efficiency, from the maximum mass flow rate of the heat transfer fluids and therefore from ventilation and/or pumping systems operating at their maximum capacity.

Nowadays, a need to adapt the operating rates of the compression system to the varying requirements of the required load and the conditions of the two heat exchange sources is increasingly required.

Refrigeration machines capable of varying their own cooling capacity by modulating the compression power are therefore increasingly widespread.

For example, it is known to use a plurality of compressors in parallel which are selectively operated and obtain a cumulative compression power which corresponds to the required cooling capacity.

The use of cyclic pumping compressors is also known, that is, which are capable of interrupting the connection between intake and exhaust for a few seconds, variable displacement compressors, for example thanks to the use of a by-pass ring regulated by valves o thanks to the provision of movable mechanical parts of the compressor, compressors driven by electronic power regulation systems, such as inverter drives, capable of varying the speed of the compressor drive motor.

For these machines with variable cooling capacity, there are working conditions in which the compression system operates at a compression power suitable to supply only a small portion of the maximum (nominal) cooling capacity of the machine, to adapt to the contingent working conditions of the application.

For example, in a beverage cooler, the refrigeration circuit must be able to operate both to allow the cans/bottles just introduced into the refrigerated compartment, therefore at room temperature, to be brought to the service temperature in the shortest possible time, and to keep the cans/bottles at the service temperature which are already at this temperature, compensating only for heat losses through the walls or cooling the little warm air introduced by the opening of the service door, for example when it is opened by a user to extract a product.

In the first of these cases, the compressor is required to operate at its maximum power for the refrigeration machine to deliver its maximum refrigeration capacity, in the second case, however, a much lower refrigeration capacity is required.

The cooling capacity modulation techniques mentioned above allow an adaptation to the required load which guarantees both the maintenance of the required temperature with greater precision and greater energy efficiency under the same conditions compared to the technology traditionally used in the past which provides for compression systems operated intermittently, at their nominal operating conditions, thus forcing inefficient on and off cycles to keep the temperature of the environment to be cooled under control.

SUMMARY OF THE INVENTION

The problem underlying the invention is therefore that of further optimizing the energy consumption of a refrigeration unit.

The main aim of the invention is to provide a method for optimizing the energy consumption of a refrigeration machine, and a refrigeration machine that implements it, which overcomes this problem.

Within this aim, the object of the present invention is to propose a method for optimizing the energy consumption of a refrigeration machine and a refrigeration machine which implements this method which allows the consumption of auxiliary heat exchange elements to be reduced without compromising the overall efficiency of the machine.

Another object of the invention is to provide a method for optimizing the energy consumption of a refrigeration machine and a refrigeration machine which implements this method which allows the operating efficiency of the inverter of the compressor controller to be increased.

This task, as well as these and other aims which will emerge more fully below, are achieved by a method for optimizing the energy consumption of a refrigeration machine and by a refrigeration machine which implements this method according to the appended independent claims.

Detailed characteristics of a method for optimizing the energy consumption of a refrigeration machine and a refrigeration machine which implements this method according to the invention are reported in the dependent claims.

BRIEF DESCRIPTION OF THE DRAWINGS

Further characteristics and advantages of the invention will become clearer from the description of a preferred but not exclusive embodiment of a method for optimizing the energy consumption of a refrigeration machine and of a refrigeration machine that implements this method according to the invention, illustrated by way of example and not limitative in the accompanying drawings, in which.

DETAILED DESCRIPTION OF THE PREFERRED EMBODIMENTS

Figure 1:
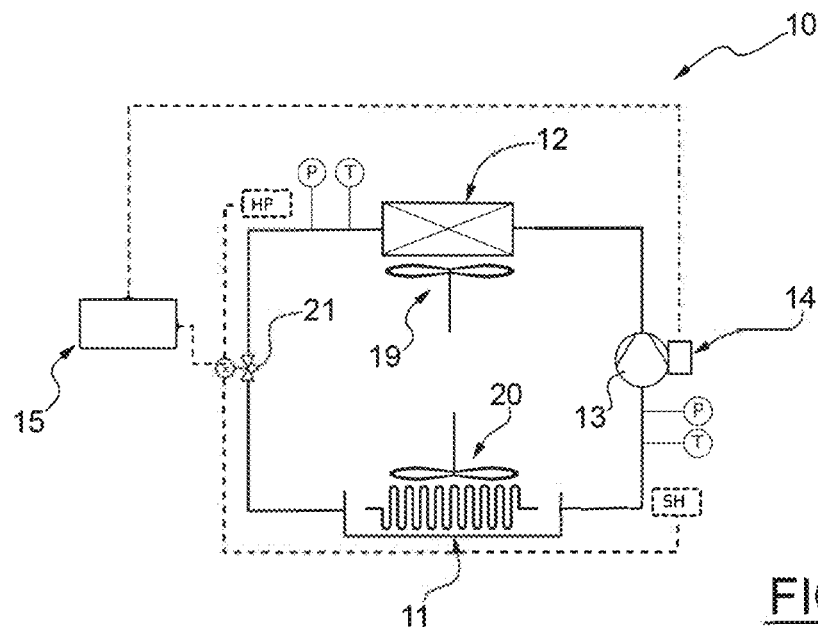
FIG. 1 illustrates a simplified diagram of a refrigeration machine according to the invention.
Figure 2:
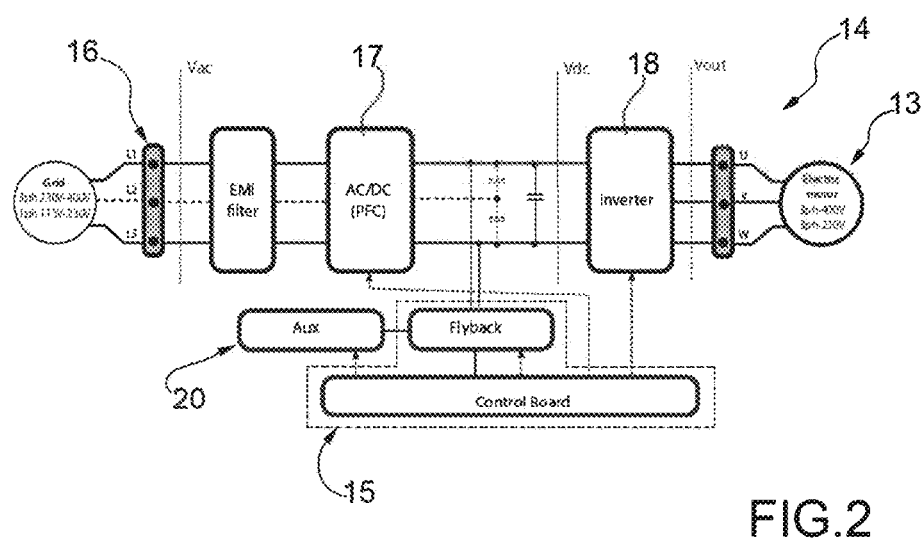
FIG. 2 illustrates a schematic detail of a refrigeration machine according to the invention relating to a compressor controller.

With particular reference to the above-mentioned figures, the numeral 10 generally indicates a refrigeration machine which comprises:

- a cold exchanger 11 and a hot exchanger 12;
- a compressor 13, with variable speed Fcomp, which has a driving device 14;
- a controller 15 connected to the driving device 14 to regulate the operating speed Fcomp of the compressor 13 on the basis of a thermodynamic optimization algorithm, which can be of a traditional type;
- at least one auxiliary member with variable Faux regime, designed for forcing a flow of fluid and having an electrical consumption Eaux, which varies according to the Faux regime, such as, for example, a fan.

The compressor 13 has an electrical consumption Ecomp, which varies according to its Fcomp speed.

The compressor 13 can be a volumetric compressor and, in particular, it can be a rotary compressor, or a spiral compressor, or a scroll compressor, with a single or double stage.

In this context, the total electrical consumption Etot is defined as the sum of the electrical consumption Ecomp of the compressor 13 and the electrical consumption Eaux of the at least one auxiliary member.

One of said auxiliary members is associated with the cold exchanger 11 and/or the hot exchanger 12 to promote the heat exchange thereof.

For example, as will be described more fully below, fans for heat exchange by forced convection can be associated with the cold exchanger 11 and the hot exchanger 12, where said fans respectively define an auxiliary member.

The driving device 14 comprises

- a connector 16 to an electrical network having a power supply voltage Vac which can be single-phase, for example with voltage of between 115V and 230V, or three-phase, for example with voltage of between 230V and 480V;
- an AC/DC converter 17 which actively converts the supply voltage into an intermediate bus voltage Vdc which can be an active power stage and which can, in particular, be configured to carry out a correction of the power factor seen at the power supply terminal 16, that is, comprising a PFC stage for converting the bus voltage Vdc into boost mode;
- an inverter 18 which converts the bus voltage Vdc into a drive voltage Vout at which the compressor 13 is powered.

The method for optimizing the consumption of the refrigeration machine 10, according to the invention, provides:

- a step A of thermodynamic optimization which activates the driving device 14 by modulating the driving voltage Vout to an optimized value Vout* designed to drive said compressor 13 at an optimized speed Fcomp* determined by means of said thermodynamic optimization algorithm;
- a step B for regulating the driving device 14 which provides for driving the AC/DC converter 17 in such a way that the bus voltage Vdc is equal to the greater of a first threshold Vdc1 and a second threshold Vdc2; where the first threshold Vdc1 is equal to the peak of the supply voltage Vac, which can be calculated for example simply by the product of $\sqrt{2}$ by the value of the effective supply voltage Vac and the second threshold Vdc2 is equal to the product of $\sqrt{2}$ by the driving voltage Vout which is the fundamental effective voltage for driving the compressor at the electrical frequency corresponding to the speed of the compressor Fcomp;
- a step C for regulating the at least one auxiliary member which modifies the Faux speed of the auxiliary member, or of the auxiliary members if more than one is provided, so as to minimize the value of the total electrical consumption Etot.

In this way, a refrigeration machine 10 which operates according to an optimization method according to the invention allows the overall consumption to be reduced by reducing the electrical consumption of the auxiliary members, such as for example any fans associated with the exchangers 11 and 12, while preserving optimized operating conditions from a thermodynamic point of view.

Moreover, thanks to the execution of step B it is possible instant by instant to calculate the minimum driving voltage Vout necessary for the optimal operation of the refrigeration unit 10, that is, optimized in accordance with said optimization algorithm.

An advantage conferred by the method for optimizing the energy consumption of a refrigeration unit, according to the invention furthermore consists in being able to maintain the bus voltage Vdc at lower values than in the prior art.

In fact, in accordance with the prior art, the bus voltage Vdc is set as a function of the maximum peak power supply voltage Vac, that is, the nominal power supply voltage Vac increased by a 10% safety margin to allow for a network power supply fluctuation. However, under normal operating conditions, the effective voltage value is lower than the nominal power supply voltage Vac, therefore, thanks to the method according to the invention, it is possible to maintain a bus voltage Vdc lower than that set by the prior art.

Structurally, the refrigeration unit 10 can comprise an expansion valve 21 designed for receiving cooling fluid from the hot exchanger 12, and possibly a liquid-vapour separator, not illustrated, and located downstream of the hot exchanger 12 which can be a condenser or gas cooler.

The expansion valve 21, which is preferably an electronic expansion valve, known as EEV valve, can be connected to the controller 15 to be operated in opening or closing in a controlled manner on the basis of the thermodynamic optimization algorithm.

The refrigeration unit 10 can also comprise a flash gas valve, of a traditional type and/or a high pressure valve which is also of a traditional type and not shown in the drawings.

The flash gas valve can put the above-mentioned liquid-vapour separator in communication with the intake of the compressor 13 to bypass refrigerant fluid vapour towards the latter.

The high pressure valve can be located downstream of the hot exchanger 12 to regulate the maximum HP cycle pressure of the cooling fluid, to keep it within optimal thermodynamic operating ranges of the refrigeration unit 10, in accordance with the thermodynamic optimization algorithm.

The flash gas valve and/or the high pressure valve are advantageously electronic expansion valves and can be connected to the controller 15 to be operated by it in accordance with the thermodynamic optimization algorithm.

Advantageously, the thermodynamic optimization algorithm is that described in the Italian patent application 102019000021534 in the name of the same applicant.

In step B, this minimum driving voltage Vout is set in such a way as to guarantee the operation of the compressor at the Fcomp speed required for the optimal thermodynamic operation of the refrigeration machine 10, but, at the same time, at a minimum value such as to work at the de-flow limit, that is, of the saturation conditions of the maximum available voltage and/or of the maximum voltage required by the compressor to operate at said optimized speed Fcomp*, to minimize the supply current of the motor of the compressor 13 and to keep the power factor as high as possible to minimize the electrical losses of the compressor 13.

In other words, step B minimizes the bus voltage Vdc with the advantage of reducing the conversion losses of the power stages, and also of the electric motor of the compressor 13, as well as the electromagnetic emissions, EMI, of the electric motor of the compressor. 13 and increase the duration in efficiency and the life of the latter thanks to the lower stress in the windings of the electric motor itself.

In accordance with the invention, step B however limits the above-mentioned reduction of the driving voltage Vout as a function of the supply voltage Vac since, if this drops, there is a risk of an increase in the current absorption from the network power supply determining current values to the AC/DC converter 17 and to the inverter 18 beyond the acceptable operating limits.

Step C may comprises repeating cyclically in sequence, for each auxiliary member:
- a step C1 of detecting a first total electrical consumption value Etot1;
- a step C2 of reducing the Faux speed of the at least one auxiliary member from a first value of Faux1 to a second value of Faux2,
- a step C3 of detecting a second overall electrical consumption Etot2 of the at least one auxiliary member;
- a step C4 of returning the operative value Faux to the first operative value Faux1 if the second total electric consumption Etot2 is not less than the first total electric consumption value Etot1.

In other words, the method can comprise reducing the Faux operation of the auxiliary member and verifying whether this reduction corresponds to a reduction in the total electrical consumption Etot; if this does not occur, the Faux speed can be restored to the value prior to its reduction.

If several auxiliary members are provided, for example the above-mentioned fans, the Faux speed of each can be reduced in succession, returning to the initial value whenever this reduction does not correspond to a reduction in the overall electricity consumption Etot.

In step C, cycles of the steps from step C1 to step C4 can be carried out by the controller 15.

This can have a processor which takes a calculation time to implement the steps from step C1 to step C4 and to process their effects.

Therefore, the cycles of the steps from step C1 to step C4, in step C, can be repeated with a time interval greater than the calculation time of the processor of the refrigeration machine and preferably with a frequency not greater than the switching frequency PWM of the inverter, for example not greater than 8 kHz.

Step B can include the following steps carried out in sequence and cyclically:
- a step B1 of detecting or calculating the voltage of power supply Vac, the bus voltage Vdc and the driving voltage Vout;
- a step B2 of calculating the first threshold Vdc1 and the second threshold Vdc2;
- a step B3 of modulating the bus voltage Vdc which assigns the value of the bus voltage Vdc to a value equal to the greater between the first threshold Vdc1 and the second threshold Vdc2.

Having defined fsw as a conversion frequency of the inverter 18, step B can comprise in sequence:
- a step B4 of detecting or estimating an operative frequency fout of the compressor 13 which is a function of the speed Fcomp of the compressor 13;
- a step B5 of adjusting the switching frequency fsw which assigns to the latter an optimized value fsw* which is between 10 and 50 times, and preferably between 15 and 20 times, the value of the operative frequency fout and in any case not less than 2 kHz.

Having defined fsc as a conversion frequency of the AC/DC converter 17, step B can comprise in sequence:
- the step B6 of detecting or estimating an electric power Pac of feeding the connector (16);
- a step B7 for adjusting the switching frequency fsc assigning the latter an optimized value fsc* which is between 100% and 80% of the maximum value of the switching frequency fsc.

The switching frequency fsc can for example be between 15 kHz and 50 kHz.

For example, a reduction of the switching frequency fsc can preferably be implemented progressively when the electrical power Pac falls below 60% of the nominal power so as to be able to reduce the switching losses without penalizing the EMI performance of the converter. If a static reduction of the switching frequency fsc is not possible, it is possible to adopt a random variation of the optimized value fsc* within the preferable range of 80%-100% in order to mitigate the energy of the disturbance in a larger spectrum and thus return in the parameters to meet the certification requirements in relation to electromagnetic emissions.

In step B, cycles of the steps from step B1 to step B3 and possibly from step B4 to step B5, are repeated with a time interval greater than a calculation time of a processor of the refrigeration machine 10, for example of the controller 15, and preferably with a switching frequency of the inverter 18 for example not greater than 8 kHz and preferably equal to the lower of fsc and fsw.

As mentioned above, the refrigeration unit 10 can be configured in such a way that the at least one auxiliary member comprises:
- a first auxiliary member 19 including a fan coupled to the cold exchanger 11 to force an air flow to lap the latter in order to determine with it a heat exchange by forced convection;
- a second auxiliary member 20 including a fan coupled to the hot exchanger 12 to force an air flow to lap the latter in order to determine with it a heat exchange by forced convection.

Clearly, the first auxiliary member 19 and/or the second auxiliary member 20 may comprise a pump where the fluid used to exchange heat with the cold exchanger 11 or with the hot exchanger 12 is a liquid instead of air or a gas in general.

If this fluid is a liquid, it can be cooled by an auxiliary refrigeration device, with variable speed, integrated in a loop for feeding this liquid to the hot exchanger 12.

This auxiliary refrigeration device can comprise a circuit in which a refrigerant fluid circulates through a compressor, a condenser, to dissipate heat, an expansion valve and an evaporator which is placed in thermal communication with the above-mentioned supply ring to cool the liquid circulating in this.

In this case, the at least one auxiliary member can also comprise the auxiliary refrigeration device and/or its compressor.

It has therefore been found that the invention achieves the intended aim and objects by providing a method for optimizing the energy consumption of a refrigeration machine, and a refrigeration machine which implements it, which allows the consumption of auxiliary heat exchange elements to be reduced without compromising the overall efficiency of the machine.

A method for optimizing the energy consumption of a refrigeration machine and a refrigeration machine which implements this method, according to the invention, allow the operating efficiency of the inverter of the compressor controller to be increased.

In particular, the efficiency of the refrigeration unit 10 is increased by reducing:
- the switching losses of the inverter 18, which depend on the switching frequency fsw;
- the switching losses of the AC/DC converter 17, which depend on its switching frequency fsc;
- the operating losses;
- the Joule effect losses due to the torque currents and eddy currents at the windings of the electric motor of the compressor 13;
- the mechanical losses at the compressor 13 and the conduction losses which depend on the torque current of the motor of the compressor 13, thanks to the modulation of the rotation speed.

In particular, the reduction of the bus voltage Vdc, obtained through step B, allows the following to be reduced: the switching losses to the AC/DC converter 17 and to the inverter 18, the electromagnetic disturbances EMI generated by the motor of the compressor 13 as well as the stresses in the motor windings of the compressor 13 due to the voltage variation over time.

In particular, it should be noted that, with respect to the traditional solutions discussed in the preamble, in the implementation of a refrigeration machine according to the invention it is taken into account that the electrical consumption of the compressor adopts amounts comparable to that of the auxiliary members, ventilation and/or pumping of the heat transfer fluid with the hot and cold exchangers, when these operate at maximum capacity.

In fact, in the traditional solutions discussed, the ventilation or pumping systems for the heat exchange with the hot and/or cold exchanger are set in order to maintain the maximum mass flow rate of the heat transfer fluids.

In accordance with the invention, however, these conditions are maintained only as long as the compressor maintains a condition of significant electrical consumption.

If the cooling capacity of this is reduced, the consumption of pumps or fans, which in the traditional solutions remains unchanged and depends only on the characteristics of the respective motors and on any dirty conditions of the exchangers, can reach comparable values if not exceed that of the compressor.

On the other hand, in a refrigeration machine according to the invention, the consumption of the auxiliary members, when the consumption of the compressor becomes comparable to them, can be modulated in order to minimize the overall energy consumption of the machine, with the same cooling capacity supplied.

The invention as it is conceived is susceptible to numerous modifications and variants, all falling within the scope of protection of the appended claims.

Further, all the details can be replaced by other technically-equivalent elements.

In practice, the materials used, as well as the contingent forms and dimensions, can be varied according to the contingent requirements and the background art.

Where the constructional and technical features mentioned in the following claims are followed by signs or reference numbers, the signs or reference numbers have been used only with the aim of increasing the intelligibility of the claims themselves and, consequently, they do not constitute in any way a limitation to the interpretation of each element identified, purely by way of example, by the signs or reference numerals.

The invention claimed is:

1. A method for optimizing the energy consumption of a refrigeration machine (10) which includes:
- a cold exchanger (11) and a hot exchanger (12);
- a variable speed Fcomp compressor (13) having a driving device (14) and an electrical consumption Ecomp, variable according to said speed Fcomp;
- a controller (15) connected to said driving device (14) to regulate said operative speed Fcomp on the basis of a thermodynamic optimization algorithm;
- at least one auxiliary member with variable speed Faux, apt to force a flow of fluid and having an electrical consumption Eaux, variable according to said speed Faux;
- wherein one of said auxiliary member is associated with said cold exchanger (11) and/or said hot exchanger (12) to promote heat exchange;
- wherein said driving device (14) comprises:
- a connector (16) to an electrical network having a single-phase or three-phase Vac power supply;
- an AC/DC converter (17) converting said supply voltage Vac into a bus voltage Vdc;

an inverter (18) converting said bus voltage Vdc into a driving voltage Vout at which said compressor (13) is powered;

said method providing:

a step A of thermodynamic optimization providing activate said driving device (14) by modulating said driving voltage Vout to an optimized value Vout* apt to drive said compressor (13) at an optimized speed Fcomp* determined by means of said thermodynamic optimization algorithm;

a step B of regulating said driving device (14) providing drive said AC/DC converter (17) so that said bus voltage Vdc is equal to the greater of a first threshold Vdc1 and a second threshold Vdc2; wherein said first threshold Vdc1 is equal to the product of $\sqrt{2}$ by the effective value of said supply voltage Vac and said second threshold Vdc2 is equal to the product of $\sqrt{2}$ by the value of said driving voltage Vout;

a step C of regulating said at least one auxiliary member providing modify the speed Faux of each of said at least one auxiliary member so as to minimize the value of an overall electrical consumption Etot which is equal to the sum of the electrical consumption Ecomp of said compressor (13) and the electrical consumption Eaux of said at least one auxiliary member, wherein said step C provides, for each of said at least one auxiliary member, cyclically repeat in sequence:

a step C1 of detecting a first overall electrical consumption value Etot1;

a step C2 of reducing the Faux speed of said at least one auxiliary member from a first value of Faux1 to a second value of Faux2, a step C3 of detecting a second overall electrical consumption Etot2 of said at least one auxiliary member;

a step C4 of returning said operative value Faux to said first operative value Faux1 if said second total electric consumption Etot2 is not less than said first total electric consumption value Etot1.

2. The method according to claim 1 wherein, in said step C, cycles of said steps from said step C1 to said step C4 are repeated with a time interval greater than a calculation time of a processor of said refrigeration machine (10).

3. The method according to claim 2 wherein said step B cyclically comprises:

a step B1 providing detect or calculate said voltage of power supply Vac, said bus voltage Vdc and said driving voltage Vout;

a step B2 of calculating said first threshold Vdc1 and said second threshold Vdc2;

a step B3 of modulating said bus voltage Vdc which provides modify the value of said bus voltage Vdc to a value equal to the greater of said first threshold Vdc1 and said second threshold Vdc2.

4. The method according to claim 3 wherein in said step B, cycles of said steps from said step B1 to said step B3 are repeated with a time interval greater than a calculation time of a processor of said refrigeration machine (10).

5. The method according to claim 2 wherein said inverter (18) has a switching frequency fsw; said step B comprises in sequence:

a step B4 of detecting or estimating an operative frequency fout of said compressor (13) which is a function of the speed Fcomp of said compressor (13);

a step B5 of adjusting said switching frequency fsw which provides assign to the latter an optimized value fsw* which is between 10 and 50 times the value of said operative frequency fout and not less than 2 kHz.

6. The method according to claim 2 wherein said at least one auxiliary member comprises:

a first auxiliary member (19) including a fan coupled to said cold exchanger (11) to force an air flow to lap the latter in order to determine with it a heat exchange by forced convection;

a second auxiliary member (20) including a fan coupled to said hot exchanger (12) to force an air flow to lap the latter in order to determine with it a heat exchange by forced convection.

7. The method according to claim 1 wherein said step B cyclically comprises:

a step B1 providing detect or calculate said voltage of power supply Vac, said bus voltage Vdc and said driving voltage Vout;

a step B2 of calculating said first threshold Vdc1 and said second threshold Vdc2;

a step B3 of modulating said bus voltage Vdc which provides modify the value of said bus voltage Vdc to a value equal to the greater of said first threshold Vdc1 and said second threshold Vdc2.

8. The method according to claim 7 wherein in said step B, cycles of said steps from said step B1 to said step B3 are repeated with a time interval greater than a calculation time of a processor of said refrigeration machine (10).

9. The method according to claim 1 wherein said inverter (18) has a switching frequency fsw; said step B comprises in sequence:

a step B4 of detecting or estimating an operative frequency fout of said compressor (13) which is a function of the speed Fcomp of said compressor (13);

a step B5 of adjusting said switching frequency fsw which provides assign to the latter an optimized value fsw* which is between 10 and 50 times the value of said operative frequency fout and not less than 2 kHz.

10. The method according to claim 1 wherein said at least one auxiliary member comprises:

a first auxiliary member (19) including a fan coupled to said cold exchanger (11) to force an air flow to lap the latter in order to determine with it a heat exchange by forced convection;

a second auxiliary member (20) including a fan coupled to said hot exchanger (12) to force an air flow to lap the latter in order to determine with it a heat exchange by forced convection.

11. The method according to claim 1, wherein step B comprises in sequence:

the step B6 of detecting or estimating an electric power Pac of feeding the connector (16);

a step B7 for adjusting the switching frequency fsc providing assign the latter an optimized value fsc* which is between 100% and 80% of the maximum value of the switching frequency fsc;

wherein fsc is a conversion frequency of the AC/DC converter (17).

12. A refrigerating machine (10) which includes:

a cold exchanger (11) and a hot exchanger (12);

a variable speed Fcomp compressor (13) having a driving device (14) and an electrical consumption Ecomp, variable according to said speed Fcomp;

a controller (15) connected to said driving device (14) to regulate said operative speed Fcomp on the basis of a thermodynamic optimization algorithm;

at least one auxiliary member with variable Faux regime, apt to force a flow of fluid and having an electrical consumption Eaux, variable according to said Faux regime;

wherein an overall electric consumption Etot is equal to the sum of the electric consumption Ecomp of said compressor (13) and the electric consumption Eaux of said at least one auxiliary member;
wherein one of said auxiliary member is associated with said cold exchanger (11) and/or said hot exchanger (12) to promote heat exchange;
wherein said driving device (14) comprises:
a connector (16) to an electrical network having a power supply voltage Vac;
an AC/DC converter (17) converting said supply voltage into a bus voltage Vdc;
an inverter (18) converting said bus voltage Vdc into an actuation voltage Vout at which said compressor (13) is powered;
wherein said refrigerating machine (10) is configured and/or programmed so as to carry out a method according to claim 1.

13. The refrigeration machine (10) according to claim 12 wherein said at least one auxiliary member comprises:
a first auxiliary member (19) including a fan coupled to said cold exchanger (11) to force an air flow to lap the latter in order to determine with it a heat exchange by forced convection;
a second auxiliary member (20) including a fan coupled to said hot exchanger (12) to force an air flow to lap the latter in order to determine with it a heat exchange by forced convection.

14. The refrigeration machine (10) according to claim 12, wherein step B comprises in sequence:
the step B6 of detecting or estimating an electric power Pac of feeding the connector (16);
a step B7 for adjusting the switching frequency fsc providing assign the latter an optimized value fsc* which is between 100% and 80% of the maximum value of the switching frequency fsc;
wherein fsc is a conversion frequency of the AC/DC converter (17).

15. A method for optimizing the energy consumption of a refrigeration machine (10) which includes:
a cold exchanger (11) and a hot exchanger (12);
a variable speed Fcomp compressor (13) having a driving device (14) and an electrical consumption Ecomp, variable according to said speed Fcomp;
a controller (15) connected to said driving device (14) to regulate said operative speed Fcomp on the basis of a thermodynamic optimization algorithm;
at least one auxiliary member with variable speed Faux, apt to force a flow of fluid and having an electrical consumption Eaux, variable according to said speed Faux; wherein one of said auxiliary member is associated with said cold exchanger (11) and/or said hot exchanger (12) to promote heat exchange;
wherein said driving device (14) comprises:
a connector (16) to an electrical network having a single-phase or three-phase Vac power supply;
an AC/DC converter (17) converting said supply voltage Vac into a bus voltage Vdc;
an inverter (18) converting said bus voltage Vdc into a driving voltage Vout at which said compressor (13) is powered;
said method providing:
a step A of thermodynamic optimization providing activate said driving device (14) by modulating said driving voltage Vout to an optimized value Vout* apt to drive said compressor (13) at an optimized speed Fcomp* determined by means of said thermodynamic optimization algorithm;
a step B of regulating said driving device (14) providing drive said AC/DC converter (17) so that said bus voltage Vdc is equal to the greater of a first threshold Vdc1 and a second threshold Vdc2; wherein said first threshold Vdc1 is equal to the product of $\sqrt{2}$ by the effective value of said supply voltage Vac and said second threshold Vdc2 is equal to the product of $\sqrt{2}$ by the value of said driving voltage Vout;
a step C of regulating said at least one auxiliary member providing modify the speed Faux of each of said at least one auxiliary member so as to minimize the value of an overall electrical consumption Etot which is equal to the sum of the electrical consumption Ecomp of said compressor (13) and the electrical consumption Eaux of said at least one auxiliary member,
wherein said step B cyclically comprises:
a step B1 providing detect or calculate said voltage of power supply Vac, said bus voltage Vdc and said driving voltage Vout;
a step B2 of calculating said first threshold Vdc1 and said second threshold Vdc2;
a step B3 of modulating said bus voltage Vdc which provides modify the value of said bus voltage Vdc to a value equal to the greater of said first threshold Vdc1 and said second threshold Vdc2.

16. The method according to claim 15 wherein said step B cyclically comprises:
a step B1 providing detect or calculate said voltage of power supply Vac, said bus voltage Vdc and said driving voltage Vout;
a step B2 of calculating said first threshold Vdc1 and said second threshold Vdc2;
a step B3 of modulating said bus voltage Vdc which provides modify the value of said bus voltage Vdc to a value equal to the greater of said first threshold Vdc1 and said second threshold Vdc2.

17. The method according to claim 16 wherein in said step B, cycles of said steps from said step B1 to said step B3 are repeated with a time interval greater than a calculation time of a processor of said refrigeration machine (10).

18. The method according to claim 15 wherein said inverter (18) has a switching frequency fsw; said step B comprises in sequence:
a step B4 of detecting or estimating an operative frequency fout of said compressor (13) which is a function of the speed Fcomp of said compressor (13);
a step B5 of adjusting said switching frequency fsw which provides assign to the latter an optimized value fsw* which is between 10 and 50 times the value of said operative frequency fout and not less than 2 kHz.

19. A refrigerating machine (10) which includes:
a cold exchanger (11) and a hot exchanger (12);
a variable speed Fcomp compressor (13) having a driving device (14) and an electrical consumption Ecomp, variable according to said speed Fcomp;
a controller (15) connected to said driving device (14) to regulate said operative speed Fcomp on the basis of a thermodynamic optimization algorithm;
at least one auxiliary member with variable Faux regime, apt to force a flow of fluid and having an electrical consumption Eaux, variable according to said Faux regime;
wherein an overall electric consumption Etot is equal to the sum of the electric consumption Ecomp of said compressor (13) and the electric consumption Eaux of said at least one auxiliary member;

wherein one of said auxiliary member is associated with said cold exchanger (11) and/or said hot exchanger (12) to promote heat exchange;

wherein said driving device (14) comprises:

a connector (16) to an electrical network having a power supply voltage Vac;

an AC/DC converter (17) converting said supply voltage into a bus voltage Vdc;

an inverter (18) converting said bus voltage Vdc into an actuation voltage Vout at which said compressor (13) is powered;

wherein said refrigerating machine (10) is configured and/or programmed so as to carry out a method according to claim 15.

20. The method according to claim 15 wherein said at least one auxiliary member comprises:

a first auxiliary member (19) including a fan coupled to said cold exchanger (11) to force an air flow to lap the latter in order to determine with it a heat exchange by forced convection;

a second auxiliary member (20) including a fan coupled to said hot exchanger (12) to force an air flow to lap the latter in order to determine with it a heat exchange by forced convection.

* * * * *